(12) United States Patent
Kim et al.

(10) Patent No.: US 12,012,728 B2
(45) Date of Patent: Jun. 18, 2024

(54) METHOD AND SYSTEM FOR MONITORING TRACK TENSION IN CONSTRUCTION MACHINERY

(71) Applicant: HD HYUNDAI INFRACORE CO., LTD., Incheon (KR)

(72) Inventors: Kwangil Kim, Incheon (KR); Jiyoung Chang, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 345 days.

(21) Appl. No.: 17/438,757

(22) PCT Filed: Mar. 4, 2020

(86) PCT No.: PCT/KR2020/003033
§ 371 (c)(1),
(2) Date: Sep. 13, 2021

(87) PCT Pub. No.: WO2020/184886
PCT Pub. Date: Sep. 17, 2020

(65) Prior Publication Data
US 2022/0154430 A1    May 19, 2022

(30) Foreign Application Priority Data
Mar. 13, 2019  (KR) .................. 10-2019-0028499

(51) Int. Cl.
*E02F 9/26* (2006.01)
*B62D 55/30* (2006.01)
*E02F 9/02* (2006.01)
*G01L 19/00* (2006.01)

(52) U.S. Cl.
CPC ................ *E02F 9/26* (2013.01); *B62D 55/30* (2013.01); *G01L 19/0007* (2013.01); *E02F 9/02* (2013.01)

(58) Field of Classification Search
CPC .... B62D 55/30; E02F 9/02; E02F 9/26; E02F 9/267; G01L 19/0007; G01L 5/04
See application file for complete search history.

(56) References Cited

U.S. PATENT DOCUMENTS

| | | | |
|---|---|---|---|
| 6,280,010 B1 * | 8/2001 | Oertley | B62D 55/30 305/144 |
| 6,305,763 B1 | 10/2001 | Oertley | |
| 6,948,783 B2 * | 9/2005 | Hoff | B62D 55/30 305/144 |
| 9,169,623 B2 * | 10/2015 | Rebinsky | G01M 17/007 |

(Continued)

FOREIGN PATENT DOCUMENTS

| KR | 10-2018-0087758 A | 8/2018 |
|---|---|---|
| WO | 2018/203091 A1 | 11/2018 |

OTHER PUBLICATIONS

International Search Report issued on Jun. 10, 2020 for corresponding international application No. PCT/KR2020/003033.

(Continued)

*Primary Examiner* — Tyler J Lee
(74) *Attorney, Agent, or Firm* — Hauptman Ham, LLP (57) ABSTRACT

In a method of monitoring track tension in construction machinery, data on predetermined major factors for monitoring track tension are received. A machine learning algorithm is performed based on the data to determine a track tension state. Information on the track tension state is displayed.

7 Claims, 5 Drawing Sheets

(56) References Cited

U.S. PATENT DOCUMENTS

| | | | | |
|---|---|---|---|---|
| 9,457,853 | B2* | 10/2016 | Anderfaas | B62D 55/305 |
| 9,691,025 | B2* | 6/2017 | Kirsch | E02F 9/264 |
| 10,235,882 | B1* | 3/2019 | Aoude | G06N 20/10 |
| 10,814,924 | B2* | 10/2020 | Haugen | B62D 55/305 |
| 2014/0324301 | A1 | 10/2014 | Rebinsky | |
| 2016/0078340 | A1* | 3/2016 | Kirsch | G06N 5/022 |
| | | | | 706/12 |
| 2016/0214664 | A1 | 7/2016 | Domholt et al. | |
| 2017/0276530 | A1* | 9/2017 | Nishikawa | B60R 16/02 |
| 2017/0372534 | A1* | 12/2017 | Steketee | G07C 5/085 |
| 2018/0005461 | A1* | 1/2018 | Steketee | E02F 9/003 |
| 2019/0390441 | A1* | 12/2019 | Storey | G05B 19/042 |

OTHER PUBLICATIONS

Written Opinion issued for corresponding International Patent Application No. PCT/2020/003033 on Jun. 10, 2020.

* cited by examiner

METHOD AND SYSTEM FOR MONITORING TRACK TENSION IN CONSTRUCTION MACHINERY

CROSS-REFERENCE TO RELATED APPLICATION

The present application is a national stage filing under 35 U.S.C § 371 of PCT application number PCT/KR2020/003033 filed on Mar. 4, 2020 which is based upon and claims the benefit of priorities to Korean Patent Application No. 10-2019-0028499, filed on Mar. 13, 2019, in the Korean Intellectual Property Office, which are incorporated herein in their entireties by reference.

TECHNICAL FIELD

The present invention relates to a track tension monitoring method and system in construction machinery. More particularly, the present invention relates to a method of monitoring tension of a track in construction machinery equipped with a caterpillar, and a track tension monitoring system for performing the same.

BACKGROUND ART

In construction machinery equipped with a caterpillar track, the track is elastically supported by a track spring and expands and contracts within a certain range to alleviate impacts in travelling. The tension of the track spring may be adjusted by injecting or discharging grease. If the tension of the track is not maintained at an appropriate level, the track and lower traveling body-related parts may be damaged. However, it is not easy for customers to determine how much tension of the track needs to be adjusted, and in case of a track adjusting device, he existing track tension adjustment device, it is difficult to maintain the tension at a desired appropriate level, and expensive and complex hydraulic circuits reduce economy efficiency and productivity.

DISCLOSURE OF THE INVENTION

Problems to be Solved

An object of the present invention provides a track tension monitoring method in construction machinery that can easily and accurately diagnose track tension at a desired point in time.

Means to Solve the Problems

According to example embodiments, in a method of monitoring track tension in construction machinery, data on predetermined major factors for track tension monitoring are received. A machine learning algorithm is performed based on the data to determine a track tension state. Information on the track tension state is displayed.

In example embodiments, the track tension monitoring method may further include performing an operating mode for monitoring track tension.

In example embodiments, the major factors may be factors remaining after removing data on factors having low learning contribution to the machine learning algorithm from operating characteristic factors.

In example embodiments, the data on the major factors may include at least one of percent load at current speed, actual engine torque rate and discharge pressure of hydraulic pump.

In example embodiments, the data on the major factors may further include fuel consumption rate, and the data on the major factors may be obtained when an engine and a hydraulic pump installed in an upper swing body of the construction machinery are operated.

In example embodiments, performing the machine learning algorithm to determine the track tension state may include performing the machine learning algorithm based on the data to calculate a short-term value for the track tension monitoring, and comparing the short-term value with a predetermined threshold value to determine the track tension state.

In example embodiments, the track tension monitoring method may further include providing the information on the track tension state to a server through a remote management device installed in the construction machinery.

In example embodiments, the track tension monitoring method may further include predicting and providing a lifespan of track-related components by using the information on the track tension state.

In example embodiments, the track tension monitoring method may further include adjusting tension of the track based on the information on the track tension state.

Effects of the Invention

According to example embodiments, data on major factors for monitoring track tension may be received, and a tension state of a track may be determined using a machine learning algorithm based on data. The data on major factors may include data on changes in pressure supplied to a travelling motor, engine load or fuel efficiency. The tension state of the track of a lower travelling body may be diagnosed using the machine learning algorithm based on the data, and time of failure thereof may be predicted.

Accordingly, an operator may easily and accurately diagnose the track tension state at a desired time without directly measuring the track tension. Further, wear life or failure of lower body-related parts may be predicted by cumulatively calculating the data on the track tension state.

However, the effect of the invention may not be limited thereto, and may be expanded without being deviated from the concept and the scope of the present invention.

BEST MODE FOR CARRYING OUT THE INVENTION

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 1:
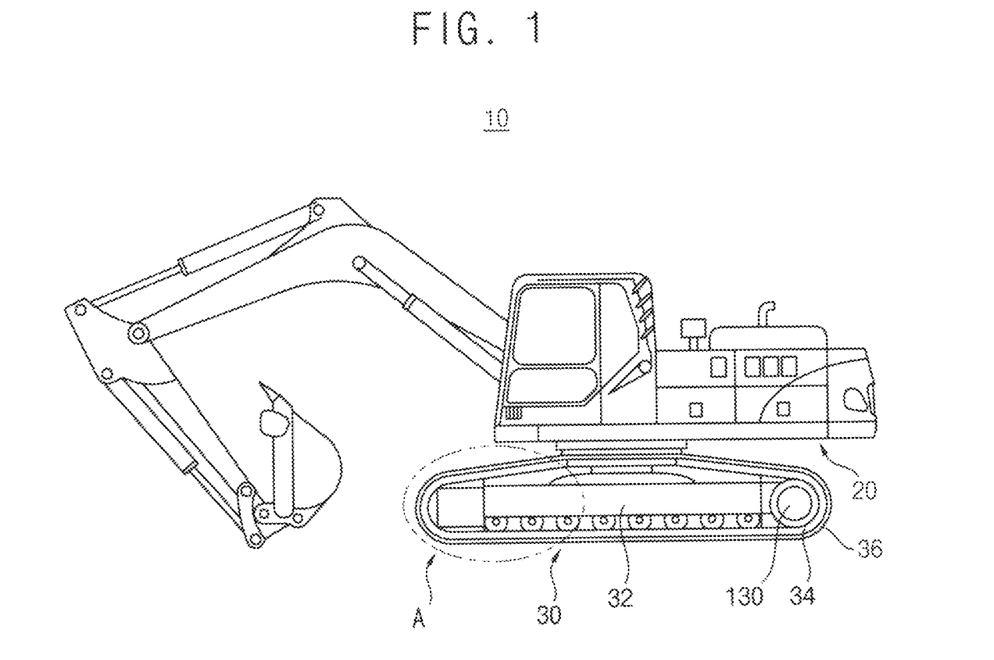
FIG. 1 is a side view showing a crawler type construction machinery according to exemplary embodiments.
Figure 2:
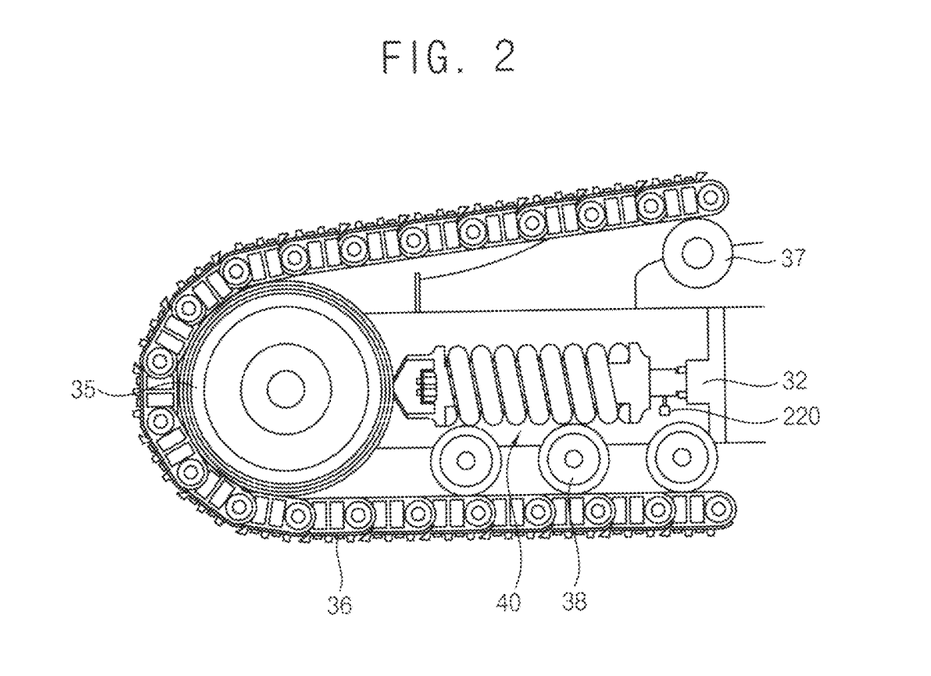
FIG. 2 is an enlarged view illustrating portion 'A' in FIG. 1.
Figure 3:
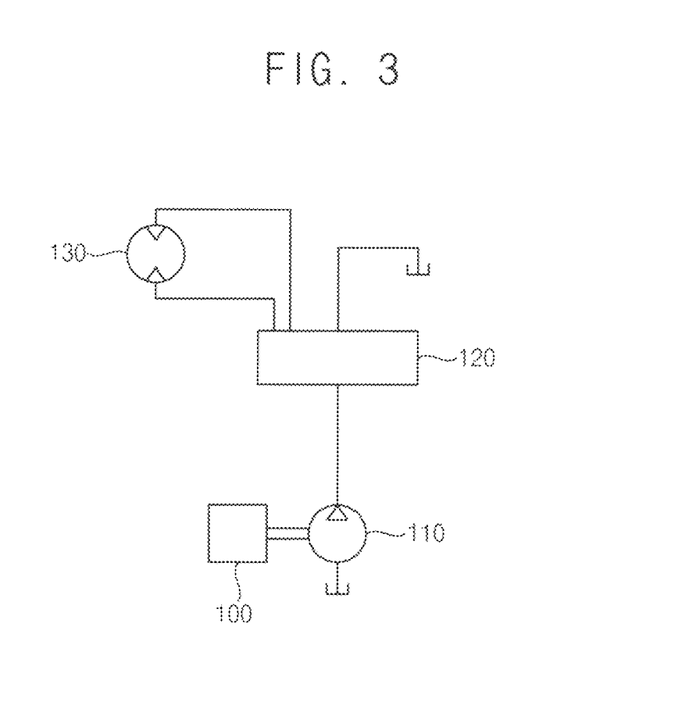
FIG. 3 is a block diagram illustrating a travelling system of the construction machinery in FIG. 1.

FIG. 1 is a side view showing a crawler type construction machinery according to exemplary embodiments. FIG. 2 is an enlarged view illustrating portion 'A' in FIG. 1. FIG. 3 is a block diagram illustrating a travelling system of the construction machinery in FIG. 1.

Referring to FIGS. 1 to 3, the traveling system of the crawler type construction machinery 10 may include an internal combustion engine 100, a hydraulic pump 110 driven by the engine 100 and a traveling motor 130 driven by hydraulic oil discharged from the hydraulic pump 110.

In example embodiments, the engine 100 may include a diesel engine as a driving source of construction machinery such as an excavator. The engine 100 may be connected to the hydraulic pump 110 through a power transmission device. Accordingly, power from the engine 100 may be transmitted to the hydraulic pump 100. Although one hydraulic pump 110 is illustrated, at least two hydraulic pumps may be connected to and driven by the engine 100. The hydraulic pump 110 may be connected to a main control valve (MCV) 120 through a hydraulic line. The main control valve 120 may be a control device for controlling a hydraulic system in the excavator. The main control valve 120 may be connected to a traveling motor 130, for example, a right traveling hydraulic motor and a left traveling hydraulic motor through a hydraulic line. Accordingly, the traveling motor may be driven by a hydraulic pressure of the hydraulic oil discharged from the hydraulic pump 110.

As illustrated in FIGS. 1 and 2, the crawler type construction machinery 10 may include an upper swing body 20 and a lower traveling body 30. The upper swing body 20 may include a cabin, the engine, a boom, an arm, a bucket, various hydraulic cylinders, a counterweight, etc. The upper swing body 20 may be mounted on the lower traveling body 30 to rotate on a plane parallel to the ground to set a working direction and the boom, the arm and the bucket by the hydraulic cylinder may be operated to perform a work. By using the counter weight, it may be possible to maintain a balance of the crawler type construction machinery 10 in operation. The lower traveling body 30 may support the upper swing body 20 and may travel the crawler type construction machinery 10 by using the power generated from the engine.

The power generated by the engine 100 may be transmitted to the hydraulic pump 110, the hydraulic oil discharged from the hydraulic pump 110 may be supplied to the traveling motor 130 located at the rear of the lower traveling body 30 to generate a rotational force, and then, the rotational force may be transmitted to a sprocket 34 of the traveling motor 130. The sprocket 34 may rotate a track 36 such that the crawler type construction machinery 10 moves forward or backward. The track 36 may be coupled to surround the sprocket 34 and an idler 35 in front of the vehicle, so that the track may rotate infinitely in a clockwise or counterclockwise direction. At this time, an upper roller 37 may prevent the track 36 from sagging downward by its own weight.

A track frame 32 may be coupled to the upper swing body 20, and may function to support the lower traveling body 30. The sprocket 34 and the idler 35 may be coupled to the track frame 32. Additionally, the track frame 32 may be formed to surround both sides of the lower traveling body 30 to protect the idler 35 and a track tension adjusting device 40 from external foreign substances.

An external force applied to the track 36 during travelling may be transmitted to the idler 35. The track tension adjusting device 40 may be installed between the idler 35 and the track frame 32 to absorb impacts caused by the external force applied to the idler 35. Additionally, a level of tension acting on the track 36 may be adjusted by an amount of lubricant injected into the track tension adjusting device 40. Accordingly, an operator may adjust the tension applied to the track by injecting the lubricant into the track tension adjusting device 40 or discharging the lubricant from the track tension adjusting device 40 to the outside.

Hereinafter, a system for monitoring track tension in the construction machinery will be explained.

Figure 4:
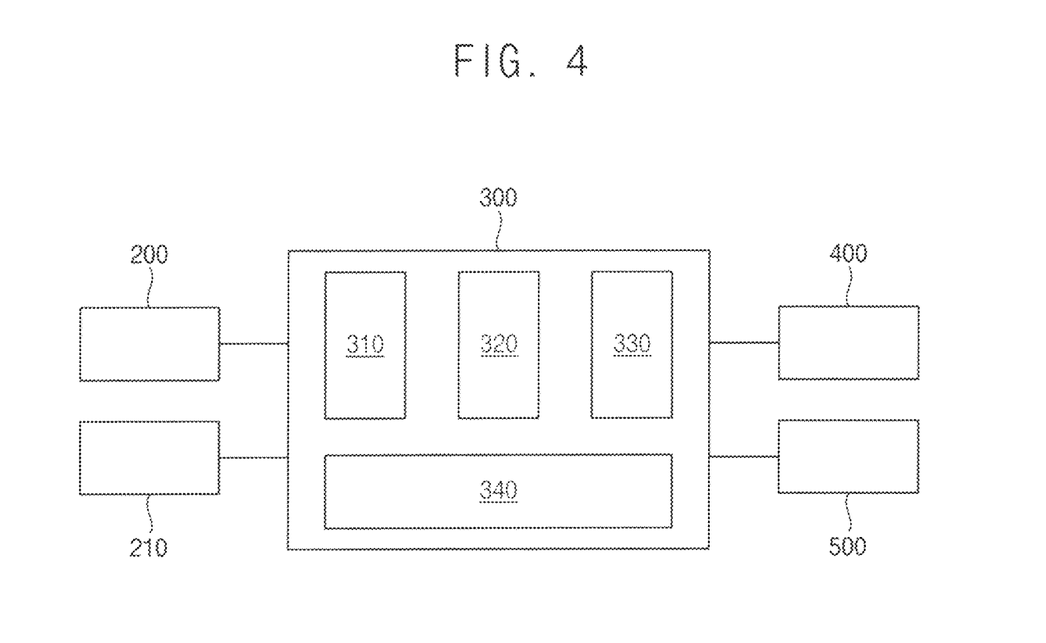
FIG. 4 is a block diagram illustrating a track tension monitoring system in construction machinery in accordance with example embodiments.

FIG. 4 is a block diagram illustrating a track tension monitoring system in construction machinery in accordance with example embodiments.

Referring to FIG. 4, a track tension monitoring system in construction machinery may include a data detection device configured to detect data on major factors for monitoring track tension, a monitoring device 300 configured to determine a track tension state, and a display device 400 configured to display information on the track tension state. The track tension monitoring system may include a remote management device 500 installed in the construction machinery to provide information on the track tension state to a server.

The data detection device may collect data on operating characteristic factors of the construction machinery. The data detection device may include an engine control unit (ECU) 200 configured to provide data on major factors to the monitoring device 300. Additionally, the data detection device may include a plurality of sensors 210 installed in the construction machinery.

In example embodiments, the data on the operating characteristic factors may include an engine rotational speed, percent load at current speed, fuel consumption rate, actual engine percent torque, discharge pressure of the hydraulic pump 110, pilot pump pressure, boom cylinder pressure, arm cylinder pressure, etc. The data on the major factors may include at least one of the percent load at current speed, the actual engine torque rate and the discharge pressure of the hydraulic pump. The data for the major factors may further include the fuel consumption rate. Here, the percent load may mean a percentage value obtained by dividing current engine torque by available torque of engine that corresponds to current engine rotation speed, and the actual engine torque ratio may be a ratio of the current engine torque divided by the maximum torque of engine. Such a percentage load and an actual engine torque ratio may be calculated from the engine control unit or a vehicle control device installed on the upper swing body. The discharge pressure of the hydraulic pump 110 may be the pressure of hydraulic oil supplied to the traveling motor, and may be measured through a pressure sensor installed in a discharge port of the hydraulic pump 110 or a hydraulic oil line connected to the traveling motor. The pressure sensor may be installed in a hydraulic oil line located in the upper swing body.

For example, the monitoring device 300 may be connected to the engine control unit (ECU) 200 to receive data on the percent load at current speed, the actual engine torque rate, the fuel consumption rate, etc. The monitoring device 300 may be connected to a pressure sensor 210 for detecting the discharge pressure of the hydraulic pump 110 to receive data on the discharge pressure of the hydraulic pump.

The monitoring device 300 may include a data receiver 310, a determiner 320, an output portion 330 and a storage portion 340.

The data receiver 310 may receive the data on the operating characteristic factors or the data on the major factors from the data detection device.

The determiner 320 may perform a machine learning algorithm based on the data to determine a track tension state. The machine learning algorithm may include at least one of a Mahalanobis Taguchi System (MTS), a neural network learning method, a Support Vector Machine (SVM) and a k-nearest neighbor (k-NN) algorithm.

For example, the determiner 320 may performing the Mahalanobis-Tagucci system based on the data on the operating characteristic factors to obtain a threshold value for monitoring the track tension. Additionally, the determiner 320 may perform the Mahalanobis-Tagucci system based on the data on the major factors to calculate a short-term value for monitoring the track tension and may compare the threshold value and the short-term value with each other to determine the track tension state. In this case, the data on the major factors may be data remaining after removing the data having low contribution to determining the threshold Mahalanobis distance value (threshold value) from the data on the operating characteristic factors. Accordingly, the data on the major factors may be determined as having high contribution to determining the threshold Mahalanobis distance value (threshold value).

The output portion 330 may output information on the track tension state. For example, the information on the track tension state may include a deflection amount of the track, a pressure value of a track spring, etc. The output portion 330 may output the information to the display device 400 such as a display panel, and the display device 400 may provide the information about the track tension state to a user.

In example embodiments, the output portion 330 may provide the information on the track tension state to the server through the remote management device 500 installed in the construction machinery. The remote management device 500 may be a Tele-Management System (TMS) module. In the server, the track tension state of the construction machinery may be recorded and managed in customer management content.

The storage portion 340 may store the information on the track tension state for each time. The determiner 320 may predict a lifespan of the track-related components by using the stored information on the track tension state, and the output portion 330 may output the information about the predicted lifespan to the display device 400.

In addition, the storage portion 340 may store the information on the track tension state for each time. The determiner 320 may predict lifespans of track-related components by using the stored information on the track tension state, and the output portion 330 may output the information about the predicted lifespans to the display device 400.

Hereinafter, a method of monitoring track tension in construction machinery using the system for monitoring track tension in the construction machinery in FIG. 4 will be explained.

Figure 5:
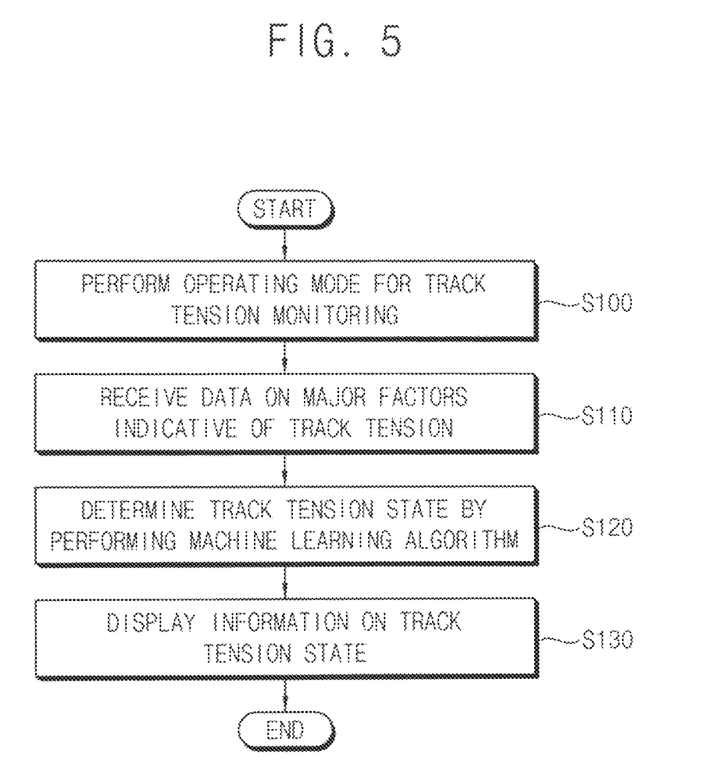
FIG. 5 is a flowchart illustrating a method for monitoring track tension in construction machinery in accordance with example embodiments.
Figure 6:
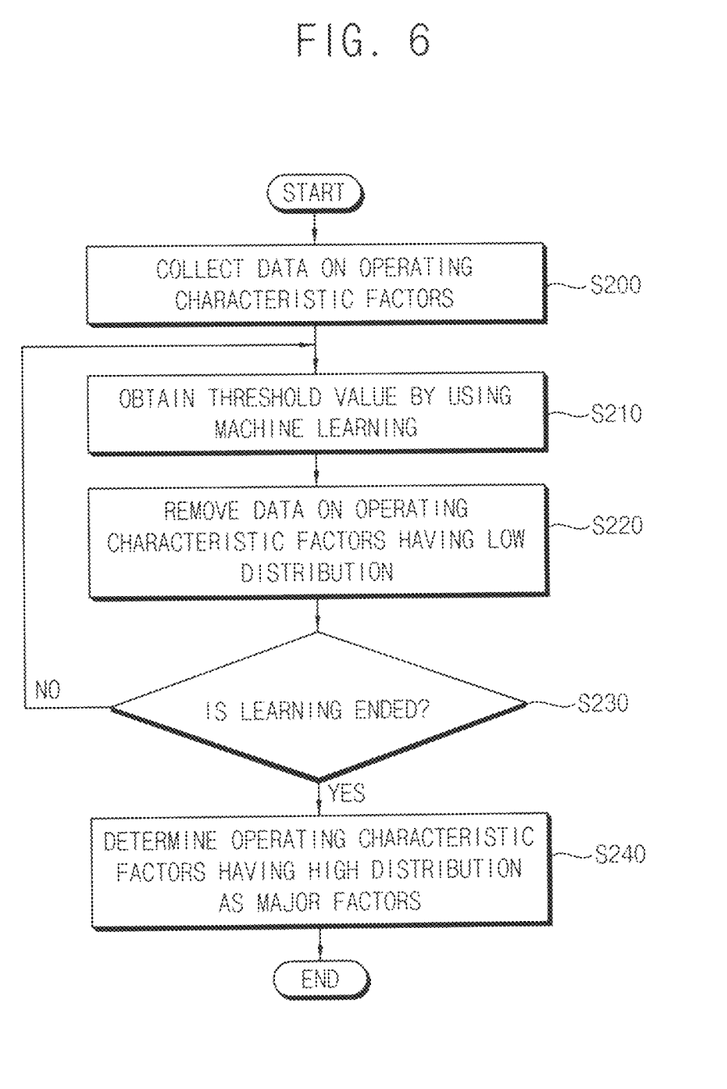
FIG. 6 is a flowchart illustrating a step of selecting data on major factors in the track tension monitoring method in FIG. 5.
Figure 7:
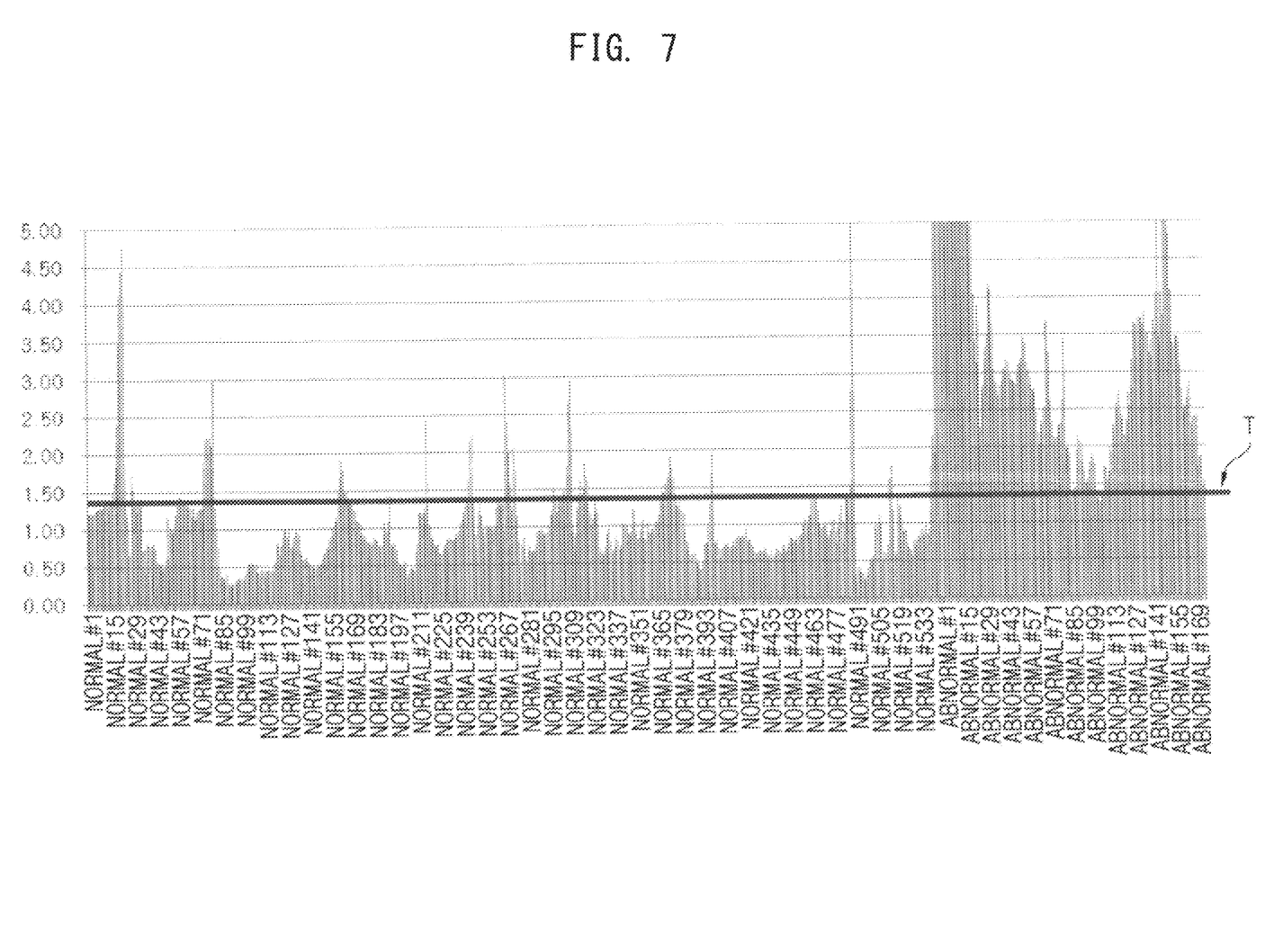
FIG. 7 is a graph illustrating results determined by the track tension monitoring method in FIG. 5.

FIG. 5 is a flowchart illustrating a method for monitoring track tension in construction machinery in accordance with example embodiments. FIG. 6 is a flowchart illustrating a step of selecting data on major factors in the track tension monitoring method in FIG. 5. FIG. 7 is a graph illustrating results determined by the track tension monitoring method in FIG. 5.

Referring to FIGS. 1 to 7, first, an operating mode for track tension monitoring may be performed (S100), and data on major factors for track tension monitoring may be received (S110).

In example embodiments, a specific driving mode may be performed for track tension monitoring. The specific driving mode may be a driving state of construction machinery where the track tension monitoring is performed more precisely, and may include, for example, a single traveling mode in which the construction machinery is driven to only travel.

Noises may be removed by receiving data in real time while performing such an operating mode. In the operating mode, when the construction machinery travels at a constant speed, data may be collected in real time.

For example, the data on the major factors may include at least one of the percent load at current speed, the actual engine torque rate, the fuel consumption rate and the discharge pressure of the hydraulic pump.

Then, a machine learning algorithm may be performed based on the data on the major factors to determine a track tension state (S120), and information on the track tension state may be displayed (S130).

For example, the machine learning algorithm may include at least one of a Mahalanobis Taguchi System (MTS), a neural network learning method, a Support Vector Machine (SVM) and a k-nearest neighbor (k-NN) algorithm.

In example embodiments, the Mahalanobis-Tagucci system may be performed based on the data on the major factors to calculate a short-term value for monitoring the track tension and the short-term value may be compared with a predetermined threshold value to determine the track tension state.

As illustrated in FIG. 7, as a result of the test of the Mahalanobis-Tagucci system, when the short-term Mahalanobis distance value is greater than the threshold Mahalanobis distance value (threshold value T) of 1.41, it may be determined as an abnormal MD.

Then, the tension of the track may be adjusted by using the track tension adjusting device 40 according to the displayed information on the state of the track tension. An operator may adjust a level of tension acting on the track 36 by adjusting a pressure of the track spring by injecting lubricant into a cylinder of the track tension adjusting device 40 or discharging the lubricant to the outside.

Hereinafter, a method of selecting and learning data on the major factors will be explained with reference to FIG. 6.

Referring to FIG. 6, data on operating characteristic factors may be collected (S200), and then, a threshold value may be obtained using machine learning (S210).

In example embodiments, the data on the operating characteristic factors of the construction machinery may be collected through the data detection device. the data on the operating characteristic factors may include an engine rotational speed, percent load at current speed, fuel consumption rate, actual engine percent torque, discharge pressure of hydraulic pump, pilot pump pressure, boom cylinder pressure, arm cylinder pressure, etc.

Then, a threshold value for determining the track tension state may be obtained using machine learning method based on the data on the operating characteristic factors. In this case, for example, the threshold value may be calculated through a Mahalanobis-Tagucci system based on the data on the operating characteristic factors. The threshold value may be a threshold Mahalanobis-Tagucci distance value. Here, a pressure sensor 220 of the track spring may be used for learning the algorithm. The pressure sensor 220 of the track spring may be installed to determine the consistency of the machine learning results or to grasp the relationship between the track tension and the major factors in advance, and after being installed only during the machine learning, the pressure sensor may not be installed during actual operation of the construction machinery. Accordingly, there may be no need to install electrical components and instruments such as sensors for measuring track tension in the lower travelling body of the construction machinery.

Then, at least one data having low contribution to determining the threshold Mahalanobis distance value may be removed from the data on the operating characteristic factors (S220). Then, learning may be ended when the calculated threshold Mahalanobis distance value is used as it is without further optimization (S224). In case of further optimization, a threshold value for the data on the operating characteristic factors remaining after removing the at least one data may be obtained again using the Mahalanobis-Tagucci system.

When learning is ended, the data on the operating characteristic factors remaining without being deleted by the contribution determination as described above may be determined as having high contribution to determining the threshold Mahalanobis distance value, and may be classified as the important characteristic factor (S240).

As mentioned above, a tension state of a track of the lower travelling body may be diagnosed using machine learning algorithms based on data on changes in pressure supplied to the travelling motor, engine load or fuel efficiency, and time of failure thereof may be predicted.

Accordingly, an operator may easily and accurately diagnose the track tension state at a desired time without directly measuring the track tension. Further, wear life or failure of the lower body-related parts may be predicted by cumulatively calculating the track tension state data.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: crawler type construction machinery
20: upper swing body
30: lower traveling body
32: track frame
34: sprocket
35: idler
36: track
37: upper roller
38: lower roller
40: track tension adjusting device
100: engine
110: hydraulic pump
120: main control valve
130: travelling motor
200: engine control unit
210: hydraulic pump pressure sensor
220: pressure sensor of track spring
300: monitoring device
310: data receiver
320: determiner
330: output portion
340: storage portion
400: display device
500: remote management device

The invention claimed is:

1. A method of monitoring track tension in construction machinery, the method comprising:
    receiving data on predetermined major factors for monitoring track tension;
    performing a machine learning algorithm based on the data to determine a track tension state; and
    displaying information on the track tension state,
    wherein the data on the major factors includes at least one of percent load at current speed, actual engine torque rate, or discharge pressure of hydraulic pump, and
    wherein the major factors are factors remaining after removing data on factors having a learning contribution value lower than a predetermined learning contribution threshold value to the machine learning algorithm from operating characteristic factors.

2. The method of claim 1, further comprising:
    performing an operating mode for monitoring track tension.

3. The method of claim 1, wherein the data on the major factors further include fuel consumption rate,
    wherein the data on the major factors are obtained when an engine and a hydraulic pump installed in an upper swing body of the construction machinery are operated.

4. The method of claim 1, wherein performing the machine learning algorithm to determine the track tension state comprises,
    performing the machine learning algorithm based on the data to calculate a short-term value for monitoring track tension; and comparing the short-term value with a predetermined threshold value to determine the track tension state.

5. The method of claim 1, further comprising:
providing the information on the track tension state to a server through a remote management device installed in the construction machinery.

6. The method of claim 1, further comprising:
predicting and providing a lifespan of track-related components by using the information on the track tension state.

7. The method of claim 1, further comprising:
adjusting tension of the track based on the information on the track tension state.

* * * * *